United States Patent [19]

Conner et al.

[11] Patent Number: 5,139,615

[45] Date of Patent: Aug. 18, 1992

[54] COMPOSITE SHEET MADE FROM MECHANICALLY DELAMINATED VERMICULITE

[75] Inventors: Herbert T. Conner, Landenberg, Pa.; David H. Dumas, Wilmington, Del.

[73] Assignee: Hercules Incorporated, Wilmington, Del.

[21] Appl. No.: 290,739

[22] Filed: Dec. 28, 1988

[51] Int. Cl.$^5$ ............................................. D21H 13/44
[52] U.S. Cl. ..................................... 162/145; 162/152; 162/164.6; 162/168.3; 162/181.6; 162/183
[58] Field of Search ..................... 162/145, 152, 181.6, 162/183, 168.2, 164.6, 168.3; 106/18.12, 415, 417, 482, 484; 428/363, 241, 324, 283

[56] References Cited

U.S. PATENT DOCUMENTS

| | | | |
|---|---|---|---|
| 3,434,917 | 3/1969 | Kraus et al. | 162/3 |
| 3,654,073 | 4/1972 | Lard et al. | 162/145 |
| 3,779,860 | 12/1973 | Oshida et al. | 162/181.6 |
| 3,916,057 | 10/1975 | Hatch et al. | 162/181.6 |
| 4,271,228 | 6/1981 | Forster et al. | 428/241 |
| 4,442,164 | 4/1984 | Briggs et al. | 428/283 |
| 4,543,287 | 9/1985 | Briggs et al. | 106/18.12 |
| 4,707,298 | 11/1987 | Tymon | 252/378 R |
| 4,762,643 | 8/1988 | Bohrn et al. | 252/378 R |
| 4,801,403 | 1/1989 | Lu et al. | 252/378 |

FOREIGN PATENT DOCUMENTS 2834548  8/1987  Fed. Rep. of Germany.
56-205599 6/1981  Japan.

OTHER PUBLICATIONS

White et al., Ceramic and Mineral Wool Fibers in Wet Web-Forming Processes, Tappi Journal, vol. 70, No. 12, pp. 67-74.
Ser. No. 07/290,592; H. T. Conner Case 1-2; Water Resistant Mineral Products: Filed Dec. 27, 1988.

*Primary Examiner*—Peter Chin
*Attorney, Agent, or Firm*—Joanne W. Patterson

[57] ABSTRACT

Disclosed is a process for making a composite sheet using papermaking techniques. The composite sheet comprises (1) 20% to 99%, based on the weight of solids, of vermiculite delaminated by mechanical shearing only, (2) 1% to 80%, based on the weight of solids, of at least one fibrous material and (3) 0.1% to 10%, based on the weight of the vermiculite, of at least one flocculating agent.

15 Claims, No Drawings

COMPOSITE SHEET MADE FROM MECHANICALLY DELAMINATED VERMICULITE

FIELD OF THE INVENTION

This invention relates to the manufacture of a composite sheet material containing the mineral vermiculite using Papermaking techniques. This invention especially relates to a process for making sheets or boards from a mixture of mechanically delaminated vermiculite and organic and/or inorganic fibers.

BACKGROUND OF THE INVENTION

Methods have been described for preparing sheet materials by flocculating and dewatering mixtures of various organic and inorganic fibers and vermiculite that has been chemically treated to effect swelling of the vermiculite lamellae prior to the application of a shearing force. For example, U.S. Pat. No. 3,434,917 describes a method for conversion of vermiculite ore into a pulp suitable for conversion into sheet form by conventional papermaking methods. The ore is treated with sodium chloride and a lithium salt solution before shearing, and asbestos or cellulose can be added to the vermiculite suspension before flocculating with potassium hydroxide or hydrochloric acid. U.S. Pat. No. 3,654,073 discloses a method for making a nonburning paper from a mixture of asbestos, glass fibers, lithium-exchanged vermiculite and a latex resin using an inorganic flocculating agent. A flocced mineral material that is water resistant and high temperature resistant is described in U.S. Pat. No. 4,707,298. The material comprises a swelled layer silicate gel prepared from vermiculite and/or mica and may optionally be mixed with fibers. A flocced mineral material that comprises a binder and a swelled layer silicate gel is disclosed in U.S. Pat. No. 4,762,643. The material may optionally contain a fibrous material selected from silicon, boron, carbon, ceramic, glass and metal fibers. However, materials made from chemically delaminated vermiculite can be difficult to drain and form into a continuous sheet on standard papermaking equipment.

A process for the production of an aqueous dispersion of mechanically delaminated vermiculite ore particles is disclosed in U.S. Pat. No. 4,801,403. This process for producing vermiculite dispersions is less costly and time consuming than chemical delamination, since it does not involve the steps of treatment of the ore with various salt solutions to effect cation exchange, washing out excess salts and swelling the ore prior to shearing. It also avoids the cost of maintaining the high processing temperatures, typically greater than 500° C., required for thermal exfoliation, another known method for expanding vermiculite prior to mechanical shearing. Also disclosed in U.S. Pat. No. 4,801,403 is a process for the production of solid articles by depositing a dispersion of mechanically delaminated vermiculite lamellae on a surface and removing water from the vermiculite. Fibers are not included in the dispersion, nor is a method disclosed for making composite sheets from such a dispersion using papermaking techniques.

SUMMARY OF THE INVENTION

It has now been found that mechanically delaminated vermiculite is unexpectedly well suited for the manufacture of composite sheets using continuous papermaking techniques. Dispersions of the mechanically delaminated vermiculite provide high drainage rates and high retention of vermiculite, thereby facilitating manufacture on conventional papermaking equipment. The process of this invention for preparing a composite sheet comprises the steps of (1) delaminating vermiculite ore by mechanical shearing only by subjecting an aqueous slurry of the ore to a shearing action until a dispersion containing vermiculite lamellae having dimensions less than 200 microns is produced, (2) dispersing in water from about 20 to about 99% of the mechanically delaminated vermiculite and from about 1 to about 80%, based on the weight of solids, of at least one fibrous material, (3) adding from about 0.1% to about 10%, based on the weight of the vermiculite, of at least one flocculating agent to flocculate the dispersion and (4) dewatering the flocculated dispersion to form a sheet.

DETAILED DESCRIPTION OF THE INVENTION

The term "vermiculite" used in this specification refers to all materials known mineralogically or commercially as vermiculite, and includes minerals consisting wholly or largely of vermiculite, including minerals of a mixed-layer type (phyllosilicates) that contain vermiculite layers as a constituent (such as hydrobiotite and chlorite vermiculite) and that can be delaminated in the same manner as vermiculite.

The vermiculite ore particles are delaminated according to this invention by subjecting an aqueous slurry of the ore to a shearing force to produce a dispersion containing vermiculite lamellae, using any suitable shearing device known in the art, such as, for example, a cowles blade, roller mill, colloid mill, or ball type mill. The shearing force can also be imparted by suitable vibratory treatment, for example, ultrasonic agitation of the aqueous ore slurry. The vermiculite ore is not previously treated with heat or with a chemical swelling agent (exfoliant) to expand the vermiculite.

Aqueous slurries of unexpanded vermiculite ore that are subjected to shearing in accordance with this invention preferably comprise from about 10% to about 50% by weight solids, the preferred range being from about 10% to about 35% by weight, and most preferably from about 20% to about 35% by weight. The weight percent solids content of the slurries is limited by such factors as the slurry viscosity, the means of shearing action employed, and the viscosity of the resulting dispersion of vermiculite lamellae.

Vermiculite lamellae produced according to this invention have a particle size typically less than 200 microns, preferably less than 50 microns. Such particles generally have an aspect ratio, i.e., length or breadth divided by thickness, of at least 10. Shearing should be applied for the minimum time necessary to achieve a dispersion containing particles of the preferred dimensions. If desired, particles that are undesirable, for example, Particles larger than 50 microns, can be removed by any conventional physical separation method after shearing. These separation methods include, but are not limited to, sedimentation, filtration, sieving, centrifuging and cyclone separation.

In accordance with a further aspect of this invention, a dispersant that does not swell the vermiculite or a combination of such dispersants can be added to the aqueous slurry of vermiculite before, during or after shearing, or a combination thereof. Slurries can be sheared at a higher solids content by adding a dispersant. The dispersant decreases the viscosity of such slurries without exfoliating (swelling) the vermiculite lamellae. Both inorganic and organic compounds can be used as the dispersants, for example, alkali metal salts of polyphosphates such as tetrasodium pyrophosphate, and derivatives of polyamines such as polyethyleneimines. A list of other suitable dispersants can be found in U.S. Pat. No. 4,801,403.

The amount of dispersant necessary to control the viscosity of the aqueous slurry of vermiculite or of the dispersion of vermiculite lamellae resulting from shearing the slurry depends upon process variables such as temperature, slurry or dispersion pH, extent of conversion of slurried vermiculite ore to vermiculite lamellae, the shearing device employed, and the solids level of the vermiculite aqueous slurry or dispersion.

After the delamination step, from about 20% to about 99%, preferably from about 60% to about 99%, of the mechanically delaminated vermiculite and from about 1% to about 80%, preferably from about 1% to about 40%, of one or more fibrous materials, based on the weight of solids, are dispersed in water. The fibrous material can be one or more types of organic or inorganic fibers or mixtures thereof. Suitable inorganic fibers include, but are not limited to, fibers made from silicon, boron, ceramic, glass, metal and mineral fibers. Suitable organic fibers include, but are not limited to, cellulosic, polyester, polyamide, polyolefin, polyimide, polyacrylate, carbon, polyamide-imide, polyether-imide and phenolic fibers. The type of fiber selected will depend upon the use for which the final product is intended.

Additives such as wet and dry strength agents, sizing agents, binders, adhesives, fire retardants and other additives known to the papermaking art can also be present in the dispersion.

A flocculating agent, or a combination of flocculating agents, is added to the dispersion of vermiculite and fibers in an amount of from about 0.1% to about 10%, preferably from about 0.7% to about 4%, based on the weight of the vermiculite, to flocculate the dispersion. The flocculating agent can be selected from any of those known in the papermaking art. Such flocculants include, but are not limited to, mineral acids, monovalent bases such as potassium hydroxide, organic acids, inorganic anions such as phosphates and sulfates, high molecular weight cationic polyelectrolytes and high molecular weight anionic polymers. A combination of an anionic acrylamide copolymer and a cationic polyamine is preferred. The flocculating agent is retained in the finished sheet.

The flocculated dispersion is deposited on conventional papermaking screens and dewatered to form a composite sheet. A continuous dewatering process can be used to form a product in roll form. After dewatering, the sheet is dried by any suitable method known in the art.

The first pass retention of the vermiculite in the sheet is generally greater than 50%, preferably greater than 80%. Such sheets can be in the form of paper, typically 5 to 30 mils thick, or paperboard, typically 1/16 to 1/8 inch thick. If desired, the sheet or board can be shaped prior to drying to produce three dimensional structures by techniques known in the art, for example, corrugation.

Composite sheet materials produced according to the process of this invention can be used for a wide variety of applications. For example, materials containing non-combustible fibers can be used as a flame spread barrier laminated to a combustible substrate such as hardboard, or to a high performance plastic such as those used in internal aircraft paneling. If a high temperature resistant fiber is included, the sheet can be used as a gasket material. Use of thermoplastic fibers such as polyolefin or polyester fibers will produce a thermoformable sheet. An electrically conductive sheet for use as an electromagnetic interference shield can be prepared using electrically conductive fibers such as carbon or metal fibers.

EXAMPLE 1

Delaminated vermiculite is prepared by shearing a mixture of 36% by weight grade 4 raw ore and water for two hours using a 6 inch colloid mill equipped with Carborundum TM stones. Particles greater than 53 microns are then removed by sieving. The vermiculite dispersion is combined with type S691 glass fibers (7.5 microns in diameter and 1/8 inch in length) supplied by Owens-Corning Fiberglass Corp., and unbleached kraft pulp that has been double disk refined to 250 Canadian Standard Freeness (CSF).

The solids concentration of the furnish is 0.5% and the weight ratio of vermiculite/glass/wood pulp is 88/6/6. KYMENE® 557H cationic resin (Hercules Incorporated) and RETEN® 523P anionic acrylamide copolymer (Hercules Incorporated) are used as the flocculants and are delivered at the first mix box and fan pump, respectively, on a flat wire Fourdrinier paper machine. Their respective levels are 2.5% and 1.2%, based on the weight of the vermiculite. Three thousand square feet of continuous roll goods are prepared. The sheet has a basis weight of 239 lbs/3000 ft$^2$ and a thickness of 15.4 mils.

EXAMPLE 2

Handsheets are prepared using a Noble and Wood handsheet machine. The vermiculite is delaminated by shearing a mixture of raw ore and water as described in Example 1 and particles greater than 53 microns are removed by sieving. The papermaking furnish is prepared by combining 1666.7 g vermiculite dispersion (total solids=7.3%), 18.0 g glass, and 360 g of a 1:1 blend of hardwood and softwood pulp (total solids=2.5%) beaten to 258 CSF, and diluting to 180 l with tap water. The weight ratio of vermiculite/glass/woodpulp is 82/12/6. Ten liters of the furnish are flocculated using 2% KYMENE® 2064 cationic resin (Hercules Incorporated), and 1.0% RETEN® 523P anionic acrylamide copolymer (Hercules Incorporated), based on the weight of the vermiculite, and drained through a 100 mesh screen. First pass retention is 97%. Drainage occurred in less than 10 seconds. The average tensile strength is 18 lb/inch width and the average tear strength is 314 g/sheet.

EXAMPLE 3

Handsheets are prepared using a Noble and Wood handsheet machine. Vermiculite is delaminated by shearing a mixture of raw ore and water as described in Example 1 and particles greater than 53 microns are removed by sieving. A papermaking furnish is prepared as described in Example 2 from a mixture of 1768.29 g delaminated vermiculite dispersion (total solids (TS)=7.3%) and 780 g of a 1:1 blend of hardwood and softwood pulp (TS =2.5%) beaten to 260 CSF. The weight ratio of vermiculite/wood pulp is 85/15. The furnish is flocculated as described in Example 2 and drained through a 100 mesh screen. Twelve handsheets are prepared. The average tensile strength is 14.8 lb/inch width and the average tear strength is 139 g/sheet.

EXAMPLE 4

Handsheets are prepared using a Noble and Wood handsheet machine. The vermiculite is delaminated by shearing a mixture of raw ore and water as described in Example 1. Particles greater than 53 microns are then removed by sieving. The papermaking furnish is prepared as described in Example 2 from a mixture of the vermiculite dispersion and type S691 glass fibers supplied by Owens-Corning Fiberglass Corp. (7.5 micron diameter, ¼ inch length) so that the weight ratio of vermiculite solids to glass solids is 87/13. The furnish is flocculated as described in Example 2. Twelve handsheets are made by drawing 1.5 liter portions through a 100 mesh screen. The average tensile strength of the handsheets is 13.2 lb/inch width and the average tear strength is 210 g/sheet.

EXAMPLE 5

Delaminated vermiculite is prepared by shearing a 40% total solids mixture of water and grade 4 vermiculite ore for 27 hours in the presence of 4% KYMENE ® 2064 cationic resin (Hercules Incorporated), based on the weight of vermiculite, as a dispersant. A 6 inch colloid mill with Carborundum ™ stones is used for shearing. Particles greater than 53 microns are then removed by sieving. The final yield of material having a particle size less than 53 microns is 54%, and the final total solids is 17%. Vermiculite (87 kg, 17.5% total solids) is added to 500 kg of standard hard water along with 2.73 kg of type F-110 glass fiber (Manville Corp.) at 84% total solids and diluted to 1750 kg with standard hard water to give a weight ratio of vermiculite/glass of 87/13. Standard hard water has an alkalinity of 50 ppm and contains 100 ppm hardness as $CaCO_3$. The final pH is 7.2. Two hundred seventy-five continuous feet of roll goods are made using a 12-inch wide flat wire Fourdrinier paper machine. The stock is flocculated with 0.6%, based on the weight of the vermiculite, of RETEN ® 523P anionic acrylamide copolymer (Hercules Incorporated) and dewatered. The basis weight of the sheet is 120 lb/3000 ft$^2$ and the thickness is 8.4 mils.

EXAMPLE 6

This example compares the drainage rate and % vermiculite retention of sheets made from chemically delaminated, thermally delaminated and mechanically delaminated vermiculite, each mixed with glass fibers. Two types of chemically exfoliated vermiculite are used for the comparison. One is a lithium-exchanged vermiculite and the other is a propylammonium chloride-exchanged vermiculite, both prepared and sheared by methods known in the art. Commercially available thermally exfoliated vermiculite is mixed with water (20% by wt. solids) and subjected to shearing for two hours using a 6 inch colloid mill equipped with Carborundum ™ stones, until 95% of the particles are less than 53 microns in size. The mechanically delaminated vermiculite is prepared by shearing a mixture of 36% by weight grade 4 raw ore and water for 5 hours using a 6 inch colloid mill equipped with Carborundum ™ stones. Particles greater than 53 microns are then removed by sieving.

The comparison is made using the Dynamic Drainage Test jar technique. Drainage jar data have been found to correlate with processibility of papermaking furnishes on commercial scale papermaking machines (see Davison, R. W. "Mechanism of Fine Particle Retention in Paper", 1982 TAPPI Papermakers Conference Proceedings, TAPPI Press, Atlanta, GA, 1982, pp. 153-164 and Davison, R. W. "Some Effects of Aqueous Environment on Fine Particle Retention in Paper", 1985 TAPPI Papermakers Conference Proceedings, TAPPI Press, Atlanta, GA, 1985, pp. 171-181). The vermiculite/glass fiber sheet is prepared by combining 50 ml of a 0.4% dispersion of type F110 ¼ inch glass fiber supplied by Manville Corp., with 100 ml of a 1% dispersion of the vermiculite in a 600 ml beaker, stirring and diluting with 500 ml of distilled water. Two percent by weight, based on the weight of the vermiculite, of a 1% aqueous solution of KYMENE ® 2064 cationic resin (Hercules Incorporated) is added to the vermiculite/glass fiber dispersion. After one minute of stirring, 1% by weight, based on the weight of the vermiculite, of a 0.5% aqueous solution of RETEN ® 523P anionic acrylamide copolymer (Hercules Incorporated) is added and the dispersion is stirred for an additional minute. The flocced dispersion is then transferred to the drainage jar and drained through the 100 mesh support screen. The time for the water to drain through the screen is recorded. The 4 inch diameter sheet is then removed from the screen, dried and weighed. If 100% of all solids are retained, the composition of the finished sheet will be 100 g vermiculite, 0.20 g glass fiber and 0.03 g flocculant. The results of the test are given in Table 1. As can be seen from the table, sheets made with the mechanically delaminated vermiculite exhibit unexpectedly fast drainage rates and high vermiculite retention compared to the other vermiculite materials. This type of performance is required for continuous production of paper on commercial scale machines.

TABLE 1

|  | Drainage Time | Sheet Weight, g | % Vermiculite Retention (Ave.) |
|---|---|---|---|
| Mechanically delaminated | 8 sec. 8 sec. | 1.21 1.2 | 96 |
| Thermally exfoliated | 103 sec. 146 sec. | 1.27 1.24 | 100 |
| Chemically exfoliated (lithium salts) | 35 sec.** 22 sec.** | 0.56 0.48 | 34 |
| Chemically exfoliated (propyl ammonium chloride) | 8 min.** 8 min.** | 0.43 0.38 | 23 |

**These sheets would not gravity drain. Times shown are for vacuum-assisted drainage at approximately - 5 psi.

EXAMPLE 7

A sheet is made from mechanically delaminated vermiculite as described in Example 6, except that an equal weight of chopped carbon fiber is used in place of the glass fiber. The drainage time is 8 sec. and the % retention of vermiculite in the sheet is 86%.

EXAMPLE 8

A sheet is made from mechanically delaminated vermiculite as described in Example 6, except that an equal weight of KEVLAR ® polyaramid fiber (Du Pont) is used in place of the glass fiber. The drainage time is 13 sec. and the % retention of vermiculite in the sheet is 94.5%.

EXAMPLE 9

A sheet is made from mechanically delaminated vermiculite as described in Example 6, except that a mixture of equal parts of PULPEX ® EA synthetic pulp (Hercules Incorporated) and glass fibers is used in place of the glass fibers alone. The drainage time is 8.5 sec and the retention of vermiculite in the sheet is 88%.

What we claim and desire to protect by Letters Patent is:

1. A composite sheet comprising (1) from about 20% to about 99%, based on the weight of solids, of vermiculite delaminated by mechanical shearing only and having a particle size of less than 200 microns, (2) from about 1% to about 80%, based on the weight of solids, of at least one fibrous material and (3) from about 0.1% to about 10%, based on the weight of the vermiculite, of a combination of a cationic and an anionic flocculant.

2. The material of claim 1 wherein the fibrous material is a combination of glass fibers and wood pulp.

3. The material of claim 1 wherein the flocculating agent is a combination of a cationic polyamine and an anionic acrylamide copolymer.

4. A process for preparing a composite sheet comprising the steps of:
   (a) delaminating vermiculite by mechanical shearing only by subjecting an aqueous slurry of the ore to a shearing action until a dispersion containing vermiculite lamellae having dimensions less than 200 microns is produced,
   (b) dispersing in water from about 20% to about 99% of the mechanically delaminated vermiculite and from about 1% to about 80%, based on the weight of solids, of at least one fibrous material,
   (c) adding from about 0.1% to about 10%, based on the weight of the vermiculite, of at least one flocculating agent to flocculate the dispersion, and
   (d) dewatering the flocculated dispersion to form a sheet.

5. The process of claim 4 which additionally comprises removing particles larger than 50 microns by physical means after step (a).

6. The process of claim 4 wherein the mechanical delamination step is carried out in the presence of a dispersant that does not swell the vermiculite.

7. The process of claim 4 wherein the dewatering step is carried out in a continuous manner to provide a composite sheet in roll form.

8. The process of claim 4 wherein the fibrous material is a combination of wood pulp and glass fibers.

9. The process of claim 4 wherein the flocculating agent is a combination of a cationic polyamine and an anionic acrylamide copolymer.

10. The composite sheet produced by the process of claim 4.

11. The composite sheet produced by the process of claim 5.

12. The composite sheet produced by the process of claim 6.

13. The composite sheet produced by the process of claim 7.

14. The composite sheet produced by the process of claim 8.

15. The composite sheet produced by the process of claim 9.

* * * * *